United States Patent Office 2,803,554
Patented Aug. 20, 1957

2,803,554
LOW LOSS CERAMIC INSULATORS AND METHOD OF MANUFACTURE

Robert D. Fenity, Cameron G. Harman, and Eugene Wainer, Cleveland, Ohio, assignors to The Star Porcelain Company, Trenton, N. J., a corporation of New Jersey No Drawing. Application July 6, 1955, Serial No. 520,345

8 Claims. (Cl. 106—65)

This invention relates to low loss ceramic bodies and to a method for manufacturing such bodies. In particular it relates to ceramic insulators having loss factors below about 0.016, good thermal shock resistance and a relatively broad firing range.

Ceramic electrical insulators are of two types: those in which electrical capacity is of prime consideration, and those in which insulating properties are of first importance. The present disclosure deals with the latter type, generally classed as low loss insulators. The quality of a low loss insulator is measured by a quantity termed the "loss factor" which is the arithmetical product of the dielectric constant times the dissipation factor of the ceramic. The dielectric constant is the ratio of the capacity of the insulator to the capacity of a vacuum of the same dimensions. The dissipation factor is a measure of the amount of electrical power lost from leakage or any other power consuming process in the ceramic. The product of these two figures is proportional to the total electrical losses due to the insulator.

In commercial low loss insulators, the dielectric constant will ordinarily fall within the range of 5 to 10, while dissipation factors vary from 0.03 for poor insulators to 0.0002 for extremely good materials. These insulators are ordinarily classified according to Army-Navy Specification JAN–I–10, dated April 29, 1944. Copies of this specification are obtainable from the Armed Services Electro Standards Agency, Fort Monmouth, New Jersey. Under this specification, ceramics are designated by grade, as shown below:

| Grade | L-1 | L-2 | L-3 | L-4 | L-5 | L-6 |
|---|---|---|---|---|---|---|
| Loss Factor | 0.150 | 0.070 | 0.035 | 0.016 | 0.008 | 0.004 |

Loss factors, for the purpose of this classification, are measured at a frequency of 1 megacycle per second after the samples have been soaked for 48 hours in distilled water at room temperature.

Many types of ceramic low loss insulators are in commercial production fulfilling various needs for electrical, thermal and strength properties. These are usually identified by the major crystalline phase present such as steatite, zircon porcelain, forsterite and alumina.

Probably the most popular type of conventional low loss high frequency insulator is the steatite insulator. Such bodies are made from a special steatitic talc with 10–15% clay added for plasticity and 5–15% barium carbonate added to increase the aging stability.

Generally such steatitic insulators fall into the L-4 or the L-5 class. Their principal drawback is that they must be fired at a relatively high temperature; i. e. from about 2250 to about 2350° F., and any particular composition must be fired within an extremely short temperature range, usually not more than about ±10° F. If fired at temperatures below this range, steatitic bodies remain porous, giving rise to high loss factors. Above the range, blistering and deformation of the bodies occur. Since it is difficult in commercial practice to control kiln temperatures closely, a high percentage of badly fired ware results, increasing the cost of the product. Steatite, moreover, has poor thermal shock resistance.

According to the invention these difficulties are overcome by ceramic insulator bodies comprising between about 10% and about 65%, preferably between about 10% and about 25%, by weight PbO, between about 20% and about 75%, preferably between about 65% and about 75%, by weight $SiO_2$ and from 0 to about 16% by weight of a trivalent metal oxide selected from the group consisting of $B_2O_3$, $Al_2O_3$ and mixtures of $B_2O_3$ and $Al_2O_3$, the proportion of $B_2O_3$ in no case exceeding about 10% by weight and the proportion of $Al_2O_3$ in no case exceeding about 6% by weight.

The invention also includes ceramic insulator bodies consisting essentially of a primary component and an inert filler, in which the primary component has the composition described.

Compositions according to the invention can be sintered at temperatures as low as 1000° F. to give insulators having loss factors not higher than about 0.016. Where the proportion of PbO is between about 10% and about 25% by weight and that of $SiO_2$ between about 65% and about 75% by weight, loss factors not higher than about 0.004 and coefficients of linear thermal expansion between about $2.3 \times 10^{-6}$ and about $3.0 \times 10^{-6}$ can be obtained. The firing range of the compositions is comparatively broad, being on the order of about ±40° F. Such materials also have thermal shock resistance which is superior to that of standard steatitic compositions.

The invention further comprises a new method of forming low loss insulator bodies having lower loss factors than other bodies of the same composition. In this connection, it has been discovered that the presence of internal stresses in fired ceramic insulator bodies causes an increase in loss factor, and that when ceramic insulators are made in such a way as to remove these stresses, lower loss factors can be obtained.

Internal stresses may arise in ceramic bodies either thermally or by reason of local areas of disconforming composition.

The formation of thermal stresses may be explained by considering glass as a supercooled liquid, having a viscosity and a tendency to flow. During heat treatment of any glass or glass contained product, such as the present ceramic bodies, there is always a temperature gradient set up through the body. This gives rise to differences in density in the body due to thermal expansion. If the material is melted and cooled slowly, thermal gradients in the early part of the cooling cycle can be compensated for by deformation of the soft, low viscosity material. Eventually however, as the body is cooled, its viscosity becomes too great to allow for compensation of density differentials and stresses develop. The point at which this occurs is known as the "strain point" and corresponds to a glass viscosity of about $10^{14.6}$ poises.

Other strains found in glass products are attributable to the existence of minute striae or cords of composition differing slightly from the composition of the major part of the body. The presence of such cords is accompanied by internal stress areas.

According to the invention, stresses from both these sources, and the increase in loss factor resulting therefrom, are eliminated. To accomplish this the invention provides a method of making low loss insulator bodies which comprises forming a frit from the components described above, reducing the frit to a finely divided state, forming the finely divided frit into a shaped body, firing the body and annealing the fired body.

In the process described, thermal stresses are eliminated by the annealing step. Stresses due to local compositional disconformities are eliminated by reducing the frit first made to finely divided form. Reduction in particle size permits chemical homogenizing as the ceramic article is fired or sintered, as well as directly reducing the size of any existing areas of disconformity.

In the compositions set forth, the silica ($SiO_2$) and lead oxide (PbO) form a glass which when reduced to powdered form and shaped into a body by ceramic techniques imparts the basic qualities of low loss factor, high thermal shock resistance and broad firing range, desired. The alumina ($Al_2O_3$) and boria ($B_2O_3$), when employed, function as auxiliary fluxes and modifiers.

As indicated, fillers may be used to reduce the cost of the finished product. They are substantially inert in that they do not enter into chemical combinations with the primary ingredient, but rather remain in crystalline form in the finished article. They therefore do not change the essential nature of the basic composition. Examples of suitable fillers are zircon, alumina, mullite, quartz, powdered fused silica, talc and wollastonite. Generally speaking, wollastonite is the filler of choice.

A binder may be added to aid in shaping the article desired. Binders may be of two types, organic or inorganic. Examples of suitable organic binders are cellulose acetate, methyl cellulose, water soluble waxes, starch and corn flour. Organic binders of this nature are completely burned out of the article in the sintering or firing process. They can be added to the composition in a proportion up to about 10%, preferably on the order of about 1%.

Inorganic binders are exemplified by clays and freshly precipitated silica gel. If clay is used, one is selected which is low in organic matter and as low as possible in the alkali metal and transition elements. Kaolin type clays from which sand and mica have been removed are preferred. Tennessee ball clays may also be used provided they are kept free from coarse sand. When clay is used as a binder it should be used in proportions between about 5% and about 15%.

Silica gel when used as a binder should be used in a proportion not more than about 10%, calculated as dry $SiO_2$.

In addition to the binder, or even when a binder is not used, a certain amount of a vehicle will be found desirable in order to form the solid ingredients into workable shapes. The vehicle may simply be water. Where an organic binder is used, it is often desirable to use an organic vehicle, such for example as acetone, amyl acetate or the like.

In making the bodies according to the invention, a frit is first prepared by melting the primary raw materials PbO, $SiO_2$ and the trivalent oxide or oxides at a temperature in the range between about 2400 and about 2800° F. to obtain a liquid of sufficiently low viscosity to pour.

The frit is then cooled by conventional methods, for example by pouring it into cold water or onto a cold metal surface, in the course of which it is caused to shatter. The frit is then reduced in particle size, preferably to 200 mesh or lower. This may be done in any suitable type of apparatus, for example in a ball mill, either wet or dry.

The ground frit may then be shaped or it may be combined with a filler, a binder or a vehicle and shaped. Shaping may be accomplished by extrusion, casting, or pressing, or by any of the conventional means used in the art to form ceramic bodies.

The shaped body is then fired or sintered in air or other oxidizing atmosphere to maturity. Where a filler has been used, the sintering temperature will be generally between about 1000° F. and about 2300° F. depending upon the filler, and the primary component. When a filler is not present, the sintering temperature will range between about 1000° F. and about 1800° F.

The time of firing will vary with the composition, from a time on the order of 10 minutes where the body contains no binder or filler, to 5 to 6 hours where a large proportion of binder or filler is included. Firing time is also dependent in large measure on the dimensions of the body.

After the articles have been fired they are annealed.

Annealing may be conducted as the articles are cooled after firing; or the articles may be cooled after firing without annealing and subsequently reheated and annealed.

In the annealing process, the article is brought to a temperature such that its viscosity is below the strain point ($10^{14.6}$ poises), and preferably below about $10^{13}$ poises. The temperature at which such viscosity will obtain will vary with the particular composition, but will generally be from about 797° F. to about 1202° F. The article is then cooled at a rate sufficiently slow that thermal stresses can be relieved by internal flow. In practice it is found that bodies according to the invention can be cooled quite rapidly, down to about 1400° F., if they have been fired above that temperature. Between about 1400° F. and about 400° F., where the strain point is usually reached, cooling should be within the range between about 20° F. per hour and about 100° F. per hour. When the viscosity has increased above the strain point cooling may be as fast as desired. To a great extent the size of the article governs the permissible rate of cooling, within this range.

The invention will be further described with reference to the following examples, it being understood that these examples are given for the purposes of illustration and are not to be taken as in any way restricting the invention beyond the scope of the appended claims.

Example I 65 parts by weight of lead oxide (PbO) and 35 parts by weight of silica ($SiO_2$) were melted to form a frit. The molten frit was poured into water and the shattered pieces were further reduced in a ball mill to a particle size through 200 mesh. Using water as a vehicle, a disc shape was formed. The article was fired at 1100° F. and annealed by cooling at about 50° F./hour. The article was found to have a loss factor of 0.015 at 1 megacycle. The composition was shown to have a vitrification range of ±30° F.

Example II 65 parts of lead oxide (PbO), 34 parts of silica ($SiO_2$) and one part of $Al_2O_3$ were mixed and fired to form a frit. The molten frit was poured into water and the shattered pieces were further reduced in a ball mill to a particle size through 200 mesh. Sufficient water was added to permit a test sample in the shape of a disc to be formed. The article was fired to about 1100° F. and annealed by cooling at about 50° F./hour. The article was found to have a loss factor of 0.016 at 1 megacycle and 0.030 at 35 megacycles. This composition was shown to have a vitrification range of ±30° F.

Example III

The procedure described in Example I was carried out with a frit having the following composition, percentages being by weight:

| | Percent |
|---|---|
| PbO | 20 |
| $SiO_2$ | 70 |
| $B_2O_3$ | 10.0 |

The shaped article was fired at about 1450° F. It was found to have a loss factor of 0.005. The composition was shown to have a vitrification range of ±50° F.

Example IV

A frit was formed of 18 parts by weight PbO and 62 parts by weight $SiO_2$. After reduction to a particle size through 200 mesh, the powdered frit was mixed with 10 parts by weight of kaolin clay as a binder. A disc-shaped body was formed and fired at a temperature of about 1600° F. and annealed. The finished product had a loss factor of 0.006. The composition was shown to have a vitrification range of ±50° F.

*Example V*

A frit was formed of 29 parts by weight of PbO and 16 parts by weight of $SiO_2$. It was reduced to particle size below about 200 mesh and the powder so formed was mixed with 55 parts of wollastonite. Using water to aid in shaping the article, a disc was formed and fired at a temperature of about 2025° F. The article was found to have a loss factor of about 0.005. This composition had a vitrification range of ±20° F.

*Example VI*

A frit was formed of 19 parts by weight PbO, 11.5 parts by weight of $SiO_2$ and 3 parts by weight $Al_2O_3$. It was reduced to a particle size below 200 mesh and was mixed with 65 parts by weight of wollastonite and 1.5 parts by weight of magnesia (MgO). Using water as a vehicle, a disc was formed and fired at a temperature of 2025° F. The article was found to have a loss factor of 0.005. The composition had a vitrification range of ±30° F.

What is claimed is:

1. An annealed ceramic low loss insulator body having a loss factor not higher than about 0.004 and a coefficient of linear thermal expansion between about $2 \times 10^{-6}$ and about $3.0 \times 10^{-6}$ per °C. and consisting essentially of between about 10% and about 25% by weight PbO, between about 65% and about 75% by weight $SiO_2$ and from 0 to about 16% by weight of a trivalent metal oxide selected from the group consisting of $B_2O_3$, $Al_2O_3$ and mixtures of $B_2O_3$ and $Al_2O_3$, the proportion of $B_2O_3$ in no case exceeding about 10% by weight and the proportion of $Al_2O_3$ in no case exceeding about 6% by weight.

2. An annealed ceramic low loss insulator body having a loss factor not higher than about 0.004 and a coefficient of linear thermal expansion between about $2 \times 10^{-6}$ and about $3.0 \times 10^{-6}$ per °C. and consisting essentially of a primary component and between about 30% and about 70% by weight of a substantially inert filler, said primary component consisting essentially of between about 10% and about 25% by weight PbO, between about 65% and about 75% by weight $SiO_2$ and from 0 to about 16% by weight of a trivalent metal oxide selected from the group consisting of $B_2O_3$, $Al_2O_3$ and mixtures of $B_2O_3$ and $Al_2O_3$, the proportion of $B_2O_3$ in no case exceeding about 10% on the weight of the primary component and the proportion of $Al_2O_3$ in on case exceeding about 6% on the weight of the primary component.

3. The ceramic body claimed in claim 2 wherein the filler is wollastonite.

4. A method of making ceramic bodies having loss factors not greater than about 0.004, which comprises preparing a frit consisting essentially of between about 10% and about 25% by weight PbO, between about 65% and about 75% by weight $SiO_2$ and from 0 to about 16% by weight of a trivalent metal oxide selected from the group consisting of $B_2O_3$, $Al_2O_3$ and mixtures of $B_2O_3$ and $Al_2O_3$, the proportion of $B_2O_3$ in no case exceeding about 10% by weight and the proportion of $Al_2O_3$ in no case exceeding about 6% by weight, reducing said frit to finely divided form, shaping the finely divided frit, firing the shaped frit and annealing the fired frit.

5. The method claimed in claim 4 wherein the finely divided frit is mixed with a vehicle before shaping.

6. The method claimed in claim 4 wherein the finely divided frit is mixed with a binder before firing.

7. A method of making ceramic bodies having loss factors not greater than about 0.004, which comprises preparing a frit consisting essentially of between about 10% and about 25% by weight PbO, between about 65% and about 75% by weight $SiO_2$ and from 0 to about 16% by weight of a trivalent metal oxide selected from the group consisting of $B_2O_3$, $Al_2O_3$, and mixtures of $B_2O_3$ and $Al_2O_3$, the proportion of $B_2O_3$ in no case exceeding about 10% on the weight of said frit and the proportion of $Al_2O_3$ in no case exceeding about 6% on the weight of said frit, reducing said frit to finely divided form and mixing the frit with a substantially inert filler, shaping the mixture of frit and filler, firing the shaped mixture and annealing the fired mixture.

8. The method claimed in claim 7 wherein the mixture before firing includes a vehicle.

References Cited in the file of this patent

UNITED STATES PATENTS

| 2,419,472 | Thiess | Apr. 22, 1947 |

FOREIGN PATENTS

| 505,830 | Great Britain | 1939 |
| 113,217 | Germany | 1900 |